United States Patent [19]

Meyke

[11] Patent Number: 5,096,638
[45] Date of Patent: Mar. 17, 1992

[54] METHOD FOR EXTRUDING A THERMOPLASTIC PLASTICS MATERIAL FOAM

[75] Inventor: Joachim Meyke, Hanover, Fed. Rep. of Germany

[73] Assignee: Hermann Berstorff Maschinenbau GmbH, Hanover, Fed. Rep. of Germany

[21] Appl. No.: 578,180

[22] Filed: Sep. 6, 1990

Related U.S. Application Data

[63] Continuation-in-part of Ser. No. 556,279, Jul. 23, 1990, abandoned.

[30] Foreign Application Priority Data

Sep. 15, 1989 [DE] Fed. Rep. of Germany ....... 3930847

[51] Int. Cl.⁵ ............................................. B29C 67/20
[52] U.S. Cl. .................... 264/45.9; 264/51; 264/53; 264/211.21; 264/DIG. 5
[58] Field of Search ................... 264/45.9, 50, 51, 53, 264/DIG. 5, 211.21

[56] References Cited

U.S. PATENT DOCUMENTS

| | | | |
|---|---|---|---|
| 4,424,287 | 1/1984 | Johnson et al. | 264/50 |
| 4,438,224 | 3/1984 | Suh et al. | 264/DIG. 5 |
| 4,470,938 | 9/1984 | Johnson | 264/50 |
| 4,548,776 | 10/1985 | Holdredge, Jr. | 264/DIG. 83 |
| 4,636,527 | 1/1987 | Suh et al. | 264/DIG. 5 |
| 4,753,762 | 1/1988 | Li et al. | 264/DIG. 5 |

*Primary Examiner*—Hubert C. Lorin
*Assistant Examiner*—Brian J. Eastley
*Attorney, Agent, or Firm*—Foley & Lardner

[57] ABSTRACT

A method of producing a foamed thermoplastic plastics material wherein the plastics material is mixed with a pulverulent nucleating agent and is then fused in an extrusion device. A gaseous nucleating agent, generally nitrogen, is then injected into the fused mixture in an amount of from about 0.1% to 0.5% by weight. Thereafter, a liquid propellant is injected into the fused mixture in an amount of from 0.5% to 6.0%, preferably 0.5% to 5.0%, by weight. The mixture is then conveyed to an extrusion head and extruder whereupon foaming occurs.

6 Claims, 1 Drawing Sheet

METHOD FOR EXTRUDING A THERMOPLASTIC PLASTICS MATERIAL FOAM

This application is a continuation-in-part application of Ser. No. 07/556,279, filed July 23, 1990 now abandoned.

BACKGROUND OF THE INVENTION

The present invention relates to a method and to an apparatus for extruding a thermoplastic plastics material foam. More particularly, the present invention relates to a method for extruding a thermoplastic plastics material foam formed from a thermoplastic plastics material and a pore regulating substance in which these materials are fused, mixed and homogenized in an extrusion device and into which a propellant is injected into the fused mixture. The present invention also relates to an extrusion device suitable for carrying out such a method.

Extruded foam products have been known for a long time In the manufacture of such products, a nucleating agent must be employed.

Combustible propellants were initially used in the manufacture of such products. An early breakthrough in the production of such foams was the use of chlorofluorohydrocarbons (CFC) as the propellants instead of the combustible propellants. Pentane had also been used as propellant. However, it has recently been ascertained that CFC gases substantially accelerate the destruction of the ozone layer in the upper atmosphere of the earth. Accordingly, there has recently been a return to the use of pentane. In view of the flammability of pentane, use of alternative propellants is desirable.

In general, the extrusion devices which are to be used to produce foams do not differ substantially from conventional extrusion devices. However, additional costly safety measures, such as use of metering systems for the addition of the propellant, intensive ventilation and means for removing electrostatic charge from the semifinished foam articles and products, must normally be used.

SUMMARY OF THE INVENTION

Accordingly, it is an object of the present invention to provide a method of producing thermoplastic plastics material foams using nucleating agents that overcome the disadvantages of the known nucleating agents.

Another object of the present invention is to provide a method of producing thermoplastic plastics material foams using propellants which have good foaming properties and which cause no damage to the ozone layer. The propellant itself should produce materials of very low foam densities, that is to say, a lightweight foam which has a very uniform cell structure.

A further object of the present invention is to provide an apparatus which is suitable for carrying out such a method.

In accomplishing the foregoing objectives, there has been provided, in accordance with one aspect of the present invention, a method of producing a foamed thermoplastic plastics material comprising the steps of providing a granulated thermoplastic plastics material; dry mixing said granulated thermoplastic plastics material with a pulverulent nucleating agent; fusing said dry mixture in an extrusion device to produce an homogenized plasticized mixture; injecting a gaseous nucleating agent into said plasticized mixture in said extruder whereby said gaseous nucleating agent accumulates on said pulverulent nucleating agent; injecting a liquid propellant into said plasticized mixture having said gaseous nucleating agent accumulated thereon, said liquid propellant being injected in an amount lying in the range of from about 0.5 to 6.0%, and preferably 0.5 to 5.0%, by weight relative to the weight of said granulated plastics material, whereby said gaseous nucleating agent forms bonding means between said pulverulent nucleating agent and said propellant, conveying said propellant-injected plasticized mixture to an extrusion head and extruding said material from said head whereby said thermoplastic plastic material foams.

In a preferred embodiment, the liquid propellant is a lower aliphatic alcohol.

In accordance with another aspect of the present invention, there is provided an extrusion device for producing a foamed thermoplastic plastics material comprising a cylindrical housing, said housing including opposed first and second end regions defining a hollow interior, screw means mounted for rotation within said hollow interior, drive means for rotating said screw, feed means disposed in said first end region of said housing for introducing said plastics material and a pulverulent nucleating agent into said hollow interior of said housing, extrusion head means disposed in said second end region for extruding said plastics material to form a foam and first and second injection zones defined within said hollow interior of said housing, first injection means communicating with said first injection zone for injecting a gaseous nucleating agent into said first injection zone and second injection means communicating with said second injection zone for injecting a liquid propellant into said second injection zone wherein said first injection zone is disposed upstream of said second injection zone means and said first and second injection are spaced from one another by a distance which is at least equal to twice the diameter of said screw.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by referring to the accompanying drawing in which.

DETAILED DESCRIPTION OF PREFERRED EMBODIMENTS

Figure 1:
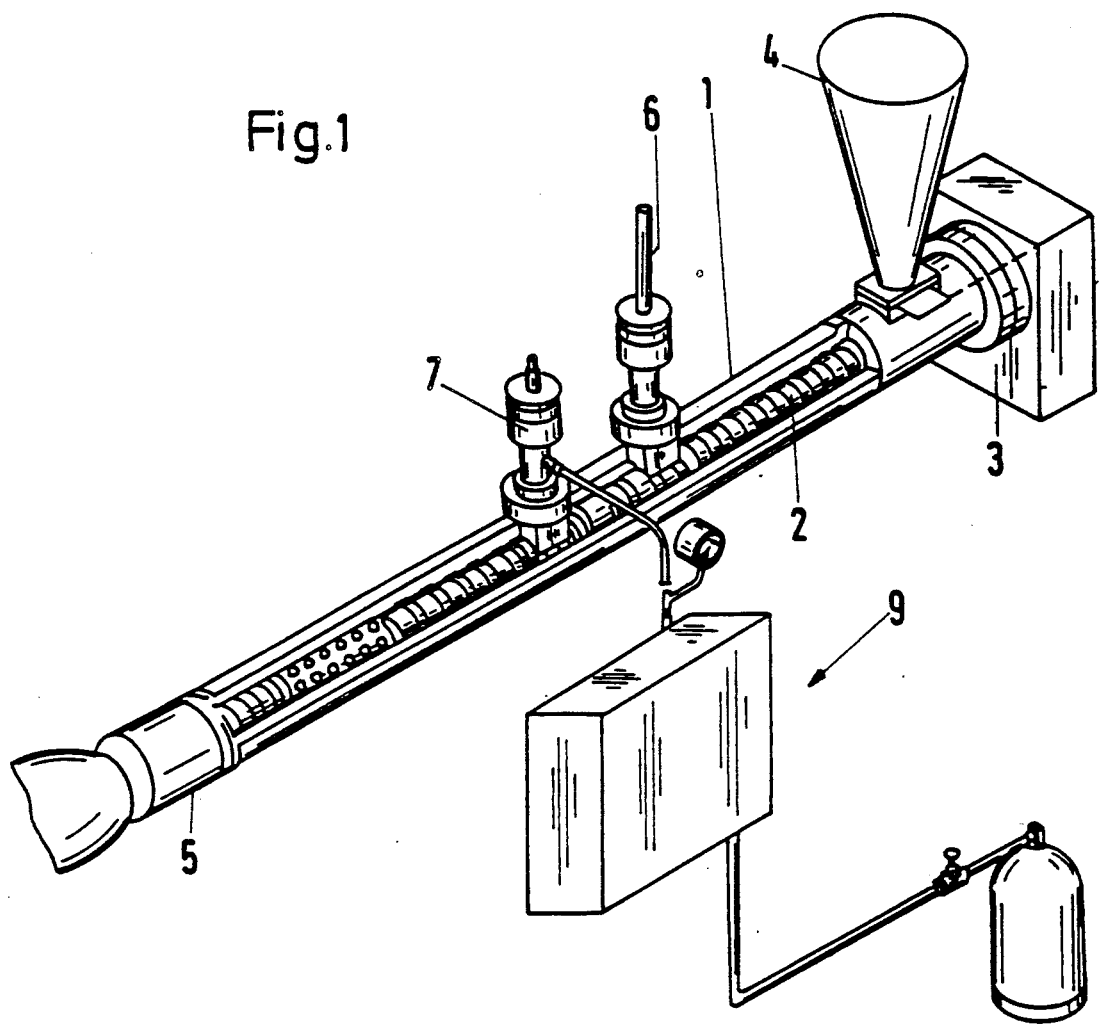
FIG. 1 is a perspective view of the extrusion device.
Figure 2:
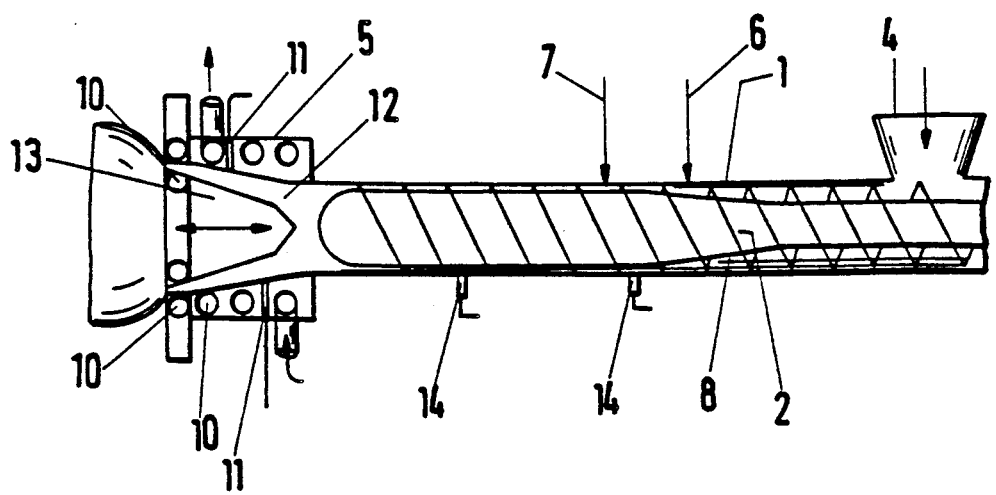
FIG. 2 is a schematic, longitudinal sectional view of the extrusion device shown in FIG. 1.

It has surprisingly been found that the injection of about 0.1% to 0.5% by weight of a gaseous nucleating or pore regulating agent, generally nitrogen, together with a liquid propellant in an amount from about 0.5% to 6.0% by weight relative to the plastics material mixed with talc, enables foams having extremely low densities and a uniform cell structure to be produced. This is particularly true if the gaseous nitrogen is initially incorporated into the fused mass of plastics material so as to act as an additional nucleating agent, and the liquid propellant is thereafter injected into the mixture.

Contrary to expectation, it was found that the amounts of nitrogen and of the liquid propellant used leads to a very uniform cell structure in the foam. Optimum results are achieved if the nitrogen is injected into the plasticized fused mass of the plastics material and pulverulent nucleating agent and then after a brief incorporation period, the liquid propellant is injected into the fused mass. In the absence of nitrogen as a second nucleating agent, a plastics material caused to foam solely by using a liquid propellant had an extremely irregular, very large cell structure. However, when a gaseous nitrogen in the above-mentioned amount was injected into the fused mass of plastics material as well as the liquid propellant, highly satisfactory results were achieved.

In the fused mass of plastics material, the gaseous nucleating agent, that is to say, the nitrogen, accumulates on the pulverulent nucleating agent. This agent is usually talc, although other pulverulent nucleating agents can also be used. When the liquid propellant is subsequently injected into the fused mass, the liquid propellant accumulates on the tiny particles of the pulverulent nucleating agent (e.g., talc) and nitrogen to a very considerable extent. A very uniform cell size and structure of the foamed material is achieved by following this sequence of introducing the substances into the fused mass. A desired density of the foamed product is also achieved.

It should also be emphasized that the nitrogen must be well distributed in the fused mass by the time that the liquid propellant is injected into the fused mass. The talc, used as the pulverulent nucleating agent, assists considerably in this respect. A minimum spacing of twice the diameter of the screw of the extrusion device between the injection zone for the nitrogen and that for the liquid propellant also assists in ensuring that the nitrogen is well distributed in the fused mass.

As a result of using the method according to the present invention, the fused mass of plastics material already containing the gaseous nucleating agent can be highly enriched with the liquid propellant whereby a very lightweight foam material having a highly desirable cell structure is produced.

In a preferred embodiment of the present invention, the liquid propellant is an alcohol, in particular a lower aliphatic alcohol. Exemplary alcohols include lower aliphatic alcohols such as ethanol, propan-2-ol and 2-methylpropan-2-ol, and also mixtures of said alcohols. Other preferred liquid propellants include acetic acid solution, propane, propene, butane, isobutane, n-butane, and isobutene.

The liquid propellant is injected in an amount lying in the range from about 0.5% to 6.0% by weight, relative to the weight of the granulated plastics material In the preferred embodiment in which the liquid propellant is a lower aliphatic alcohol, the range is from about 0.5% to 5.0% by weight.

Furthermore, the above-mentioned lower aliphatic alcohols provide the additional advantage that, when the fused mass emerges from the nozzle in the extrusion head, efficient cooling occurs. Thus, for example, if ethanol, having a boiling point of 78° C., is used, surprisingly rapid hardening of the foamed structure as it emerges from the extrusion nozzle is observed.

As will be seen hereinafter, mixtures of the three above-mentioned alcohols also produce good foam results.

Mixtures containing approximately 50% of one of the above alcohols and approximately 50% of another of the above alcohols have proved particularly efficacious. Such mixtures lead to the production of foams having acceptable densities and uniform cell structures. The ratio of one alcohol to the other can lie within the range of about 20% : 80% to 80% : 20% with no adverse effect on the foam produced.

The above-mentioned alcohols can also be mixed with up to 30% water. However, the cell size in the foam produced may be affected thereby. A larger cell size is obtained if a 20% dilution of the alcohol is employed. If, however, the alcohol is diluted with more than about 35% water, very large cells of a non-uniform size are formed.

Turning now to the drawing, one embodiment of an extrusion device in accordance with the present invention will be further described, by way of example. In FIG. 1 of the drawings, there is shown an extrusion device 1 which comprises a screw 2 rotatable in a hollow barrel. The screw is rotated by means of a drive and transmission unit 3. The thermoplastic plastics material to be foamed in this embodiment, a mixture of polystyrene and talc which latter is utilized as a pulverulent nucleating agent, is introduced through a feed hopper 4 into the barrel and is conveyed by the screw in the direction of the extrusion head 5.

Gaseous nitrogen which is used as an additional nucleating agent is injected into the extrusion chamber 8, that is to say, the hollow interior of the barrel, through a first injection nozzle 6, and the liquid propellant, in this case ethanol, is injected into the extrusion chamber 8 through a second injection nozzle 7 at a pressure which is in excess of that subsisting in the chamber 8. The axial spacing of the nozzles 6 and 7 from one another is at least twice the diameter of the screw 2. Metering devices 9, known per se are used for metering both the nitrogen and the ethanol liquid propellant.

Temperature control conduits 10 are provided in the extrusion head. These conduits communicate with temperature controlling devices which are well known and therefore not shown.

The extrusion head 5 defines a chamber 12 and the pressure therein is measured by means of pressure sensors 11 The pressure in chamber 12 is dependent upon the configuration of the flow conduits entering and leaving the head and upon the location of a mandrel 13 over which the extruded material is caused to flow. The mandrel 13 is axially adjustable in the direction of the double-headed arrow and the configuration of the flow conduits can be selected as desired by the circumstances of the extrusion. The pressure in the extrusion chamber 8 is also detected by means of pressure sensors 14 and the values obtained can be used as necessary.

The invention will be further described, by way of illustration only, with reference to the following non-limitative Example.

EXAMPLE

Polystyrene (99.5 kg) in granular form together with talc (0.5 kg) was introduced into the extrusion device 1. The talc, which is in pulverulent form, acts as a pore regulating agent or nucleating agent. The mixture was fixed in the device 1.

Gaseous nitrogen acting as a second pore regulating or nucleating agent, was injected into the fused mass through the injection nozzle 6. The amount of nitrogen used constituted 0.2% of the weight of the mixture of polystyrene and talc.

After this mixture of polystyrene and two pore regulating or nucleating agents, that is to say, the talc and the nitrogen, had been further mixed and homogenized in the extrusion device, the liquid propellant (ethanol) was injected into the mixture through the injection nozzle 7. In this Example, the amount of liquid ethanol used constituted 1% of the weight of the mixture of polystyrene and talc, and the alcoholic content of the propellant amounted to 89%.

After such injection the mixture was further mixed and homogenized in the extrusion device 1. The mixture was then conveyed, by the extrusion screw 2, to the extrusion head 5, where a mixture pressure of 60 to 80 bar and a mixture temperature of at least 115° C. were set. The mixture was extruded from the head, whereupon foaming occurred.

A foam material having a density 170 kg/m$^3$ was thus produced. The foamed material had a very fine and uniform cell structure and a thickness of 1.5 mm.

Further trials were carried out following the above-described procedure but in which the liquid propellant employed was varied, different amounts of the selected alcohols were used as the liquid propellant and the proportions of the liquid propellant (the alcohol) and the second nucleating agent (the nitrogen) were also varied. The results obtained appear in tabular form hereinafter. Two trials, Nos. 1 and 2 in the Tables, were carried out without using nitrogen as a second pore regulating or nucleating agent. These two trials are not, therefore, in accordance with the present invention and are given for comparative purposes only. Trial No. 3 in the Tables refers to the specific Example, described hereinbefore.

TABLE 1

| Trial No. | 2nd nucleating agent (N$_2$) % by wt. | Propellant (C$_2$H$_5$OH) % by wt. | Density Kg/m$^3$ | Foam thickness mm | Liquid Propellant content % | Remarks. |
|---|---|---|---|---|---|---|
| 1 | — | 1.8 | 310 | 0.8 | 85 | coarse celled, hard foam |
| 2 | — | 2.2 | 250 | 1.3 | 85 | coarse celled, hard foam. |
| 3 | 0.2 | 1.0 | 170 | 1.5 | 99 | fine, uniform cell structure. |
| 4 | 0.2 | 2.0 | 132 | 1.9 | 99 | fine, uniform cell structure. |
| 5 | 0.2 | 3.0 | 90 | 2.5 | 99 | — |
| 6 | 0.2 | 1.0 | 210 | 1.0 | 85 | larger cells |
| 7 | 0.2 | 2.6 | 114 | 2.7 | 85 | larger cells |
| 8 | 0.2 | 2.2 | 180 | 20 | 99 | fine celled |
| 9 | 0.2 | 3.0 | 120 | 30 | 99 | fine celled |
| 10 | 0.2 | 4.0 | 100 | 40 | 99 | fine celled |
| 11 | 0.2 | 2.0 | 140 | 25 | 85 | larger cells, more dimensionally stable. |
| 12 | 0.2 | 2.8 | 75 | 48 | 85 | larger cells, more dimensionally stable. |

TABLE 2

| Trial No. | 2nd nucleating agent (N$_2$) % by wt. | Propellant (C$_3$H$_7$OH) % by wt. | Density kg/m$^3$ | Foam thickness mm | Liquid Propellant content % | Remarks. |
|---|---|---|---|---|---|---|
| 13 | 0.2 | 1.0 | 165 | 1.3 | 99 | fine celled |
| 14 | 0.2 | 3.0 | 93 | 2.4 | 99 | fine celled |
| 15 | 0.2 | 1.0 | 160 | 1.6 | 85 | larger cells, more dimensionally unstable |
| 16 | 0.2 | 3.0 | 89 | 2.5 | 85 | larger cells, more dimensionally stable. |

TABLE 3

| Trial No. | 2nd nucleating agent (N$_2$) % by wt. | Propellant (C$_4$H$_9$OH) % by wt. | Density kg/m$^3$ | Foam thickness mm | Liquid Propellant content % | Remarks. |
|---|---|---|---|---|---|---|
| 17 | 0.2 | 1.0 | 155 | 1.6 | 99 | fine celled. |
| 18 | 0.2 | 3.0 | 85 | 2.6 | 99 | fine celled |
| 19 | 0.2 | 1.0 | 160 | 1.6 | 85 | larger cells, more dimensionally stable. |
| 20 | 0.2 | 3.0 | 86 | 2.6 | 85 | larger cells, more dimensionally stable. |

TABLE 4

| Trial No. | 2nd nucleating agent (N$_2$) % by wt | Propellant C$_3$H$_7$OH + C$_2$H$_5$OH Mixture (50%:50%) | Density kg/m$^3$ | Foam thickness mm | Liquid Propellant content % | Remarks. |
|---|---|---|---|---|---|---|
| 21 | 0.2 | 3.0 | 92 | 2.5 | 99/99 | fine celled |
| 22 | 0.2 | 3.0 | 90 | 2.6 | 85/85 | larger cells |

TABLE 5

| Trial No. | 2nd nucleating agent (N₂) % by wt | Propellant C₂H₅OH + C₄H₉OH Mixture (50%:50%) | Density kg/m³ | Foam thickness mm | Liquid Propellant content % | Remarks |
| --- | --- | --- | --- | --- | --- | --- |
| 23 | 0.2 | 3.0 | 88 | 2.5 | 99/99 | fine celled |
| 24 | 0.2 | 3.0 | 91 | 2.6 | 85/85 | larger cells |

TABLE 6

| Trial No. | 2nd nucleating agent (N₂) % by wt | Propellant C₃H₇OH + C₄H₉OH Mixture (50%:50%) | Density kg/m³ | Foam thickness mm | Liquid Propellant content % | Remarks |
| --- | --- | --- | --- | --- | --- | --- |
| 25 | 0.2 | 3.0 | 90 | 2.5 | 99/99 | fine celled |
| 26 | 0.2 | 3.0 | 91 | 2.5 | 85/85 | larger cells |

When the trials set forth in the Tables were carried out, a pressure of between 180 and 220 bar was set in the extrusion chamber 8 in the region of injection nozzles 6 and 7. The pressure was reduced to approximately 100 bar at the end of the screw 2. On average, a pressure of 60 to 80 bar was measured for the mixture of material and propellant in the head. The temperature of the mixture was approximately 240° C.; this being in the extrusion chamber 8 in the region of the injection nozzles. The temperature was then set to 115° C. towards the tip of the screw.

As aforementioned, the Tables show different liquid propellants, trials carried out using varying amounts of propellants and different proportions of the second pore regulating or nucleating agent and propellant relative to one another. Trials 1 and 2 in the Tables, which are not in accordance with the present invention, were carried out without using a second pore regulating or nucleating agent. By comparing these two Trials with the other Trials, it is readily apparent that Trials 1 and 2 do not lead to the production of acceptable foamed products. These latter are only achieved if nitrogen is used as the second nucleating or pore regulating agent. It is also apparent that the liquid propellants used, which here are environmentally friendly alcohols, only produce the desired results when used in conjunction with nitrogen.

More specifically, Trials 1 and 2 show clearly that the cell structure of the foamed product formed when the liquid propellant is used in the absence of nitrogen is irregular. Moreover, the foamed plastics material thus produced was very brittle. Only when gaseous nitrogen acting as the second nucleating or pore regulating agent, was used in conjunction with the liquid propellant was a foamed product having a uniform cell structure produced. Moreover, the joint use of the liquid propellant and nitrogen improved propellant enrichment and also improved the density of the product.

A total of 26 trials are listed in the Tables. Each Trial shows the percentages, by weight, of the nitrogen and the alcohol liquid propellant used the product density achieved, the foam thickness, and the alcohol percentage used. The alcohol percentages stated signify that the remaining percentage is, in each case, water. A commercially available polystyrene was used as the plastics material.

I claim:

1. A method of producing a low density foamed thermoplastic plastics material of uniform cell structure comprising the steps of:
   providing a granulated thermoplastic plastics material;
   dry mixing said granulated thermoplastic plastics material with talc to form a dry mixture;
   fusing said dry mixture in an extrusion device to produce an homogenized plasticized mixture;
   injecting gaseous nitrogen into said plasticized mixture in said extruder, whereby a portion of said nitrogen forms a plurality of nucleation points and a portion of said nitrogen accumulates on said talc, said nitrogen being introduced in an amount of from about 0.1 to 0.5% by weight relative to the weight of said thermoplastic plastics material;
   injecting a liquid propellant into said plasticized mixture, said liquid propellant being a lower aliphatic alcohol selected from the group consisting of ethanol, propan-2-ol, 2-methylpropan-2-ol and mixtures of said alcohols, said alcohol being injected in an amount lying in the range of from about 0.5% to 6.0% by weight relative to the weight of said granulated plastics material, whereby said nitrogen forms bonding means between said talc and said alcohol;
   conveying said propellant-injected plasticized mixture to an extrusion head; and
   extruding said material from said head whereby said thermoplastic plastic material foams, and wherein the temperature in said extruder in the region of said injections is approximately 240° C., and the pressure in such region is 180–220 bar.

2. A method as claimed in claim 1, wherein said liquid propellant is injected in an amount lying in the range of from about 0.5% to 5% by weight relative to the weight of said granulated plastics material.

3. A method as recited in claim 1, wherein said liquid propellant is a mixture comprising from about 20% to 80% ethanol and from about 80% to 20% propan-2-ol.

4. A method as recited in claim 1, wherein said liquid propellant is a mixture comprising from about 20% to 80% 2-methylpropan-2-ol and from about 80% to 20% ethanol.

5. A method as recited in claim 1, wherein said liquid propellant is a mixture comprising about 20% to 80% propan-2-ol and about 80% to 20% 2-methylpropan-2-ol.

6. A method as recited in claim 3, wherein each said alcohol is mixed with up to about 30% water.

* * * * *